United States Patent
Sandström et al.

(10) Patent No.: US 8,504,229 B2
(45) Date of Patent: Aug. 6, 2013

(54) METHOD AND DEVICE FOR SELECTING A STARTING GEAR IN A HYBRID ELECTRIC VEHICLE

(75) Inventors: Jessica Sandström, Sävedalen (SE); Johan Larsson, Stenungsund (SE); Peter Templin, Västra Frölunda (SE)

(73) Assignee: Volvo Lastvagnar AB, Göetborg (SE)

( * ) Notice: Subject to any disclaimer, the term of this patent is extended or adjusted under 35 U.S.C. 154(b) by 112 days.

(21) Appl. No.: 13/125,312

(22) PCT Filed: Oct. 21, 2008

(86) PCT No.: PCT/SE2008/000606
§ 371 (c)(1),
(2), (4) Date: Sep. 7, 2011

(87) PCT Pub. No.: WO2010/047624
PCT Pub. Date: Apr. 29, 2010

(65) Prior Publication Data
US 2012/0130575 A1  May 24, 2012

(51) Int. Cl.
*B60W 10/00* (2006.01)
(52) U.S. Cl.
USPC .......................................................... 701/22
(58) Field of Classification Search
USPC . 701/22, 51–52; 307/9.1, 10.1; 903/902–905, 903/911, 917; 180/65.1, 65.21, 65.6
See application file for complete search history.

(56) References Cited

U.S. PATENT DOCUMENTS

| | | | | |
|---|---|---|---|---|
| 4,042,056 A | * | 8/1977 | Horwinski | 180/65.25 |
| 4,533,011 A | * | 8/1985 | Heidemeyer et al. | 180/65.25 |
| 5,343,970 A | | 9/1994 | Severinsky | |
| 5,427,196 A | * | 6/1995 | Yamaguchi et al. | 180/65.21 |
| 5,562,565 A | * | 10/1996 | Moroto et al. | 477/3 |
| 2007/0232440 A1 | | 10/2007 | Han | |

FOREIGN PATENT DOCUMENTS

| | | |
|---|---|---|
| EP | 1177930 A2 | 2/2002 |
| EP | 1738948 A1 | 1/2007 |
| EP | 1792800 A2 | 6/2007 |
| WO | 0156824 A1 | 8/2001 |

OTHER PUBLICATIONS

International Search Report for corresponding International Application PCT/SE2008/000606.

* cited by examiner

*Primary Examiner* — Yonel Beaulieu
(74) *Attorney, Agent, or Firm* — WRB-IP LLP

(57) ABSTRACT

In a method and device for selecting a starting gear in a hybrid electric vehicle, a first driving sequence is registered during which a parameter indicates that an electric motor energy source has been drained past an energy level limit and/or no gear ratio shift from said starting gear ratio has occurred. Upon detection of the driving sequence, draining of said energy source and/or no gear ratio shift, selection of a starting gear ratio is altered to a gear ratio being higher, compared to a normal starting gear ratio, for the next vehicle take off of a driving sequence following the first driving sequence. This increases possibility that the vehicle during driving with the altered starting gear will reach a vehicle speed that corresponds to a combustion engine speed above idle speed of the combustion engine.

16 Claims, 4 Drawing Sheets

METHOD AND DEVICE FOR SELECTING A STARTING GEAR IN A HYBRID ELECTRIC VEHICLE

The present invention relates to a method and device for selecting a starting gear in a hybrid electric vehicle. The present invention also relates to a computer program, computer program product and a storage medium, such as a computer memory, all to be used with a computer for executing said method.

The need to reduce fossil fuel consumption and emissions in vehicles powered by internal combustion engines (ICE) is well known. Vehicles powered by electric motors attempt to address these needs. However, electric vehicles have limited range and limited power capabilities and need substantial time to recharge their batteries. An alternative solution is to combine both an ICE and electric traction motor into one vehicle. Such vehicles are typically called Hybrid Electric Vehicles (HEVs). See for example, U.S. Pat. No. 5,343,970.

The HEV is described in a variety of configurations.

Many HEV patents disclose systems in which an operator is required to select between electric and internal combustion operation. In other configurations, the electric motor drives one set of wheels and the ICE drives a different set.

Other, more useful, configurations have developed. For example, a Series Hybrid Electric Vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive. wheels.

A Parallel Hybrid Electrical Vehicle (PHEV) configuration has an engine (most typically an ICE) and an electric motor that together provide the necessary wheel torque to drive the vehicle. Additionally, in the PHEV configuration, the motor can be used as a generator to charge the battery from the power produced by the ICE. The PHEV has usually a transmission between the ICE and drive wheels of the vehicle in order to be able to alter gear ratio between the ICE and the drive wheels and also in many cases between the electric motor and the drive wheels.

A Parallel/Series Hybrid Electric Vehicle (PSHEV) has characteristics of both PHEV and SHEV configurations and is typically known as a "powersplit" configuration. In the PSHEV, the ICE is mechanically coupled to two electric motors in a planetary gearset transaxle. A first electric motor, the generator, is connected to a sun gear. The ICE is connected to a carrier. A second electric motor, a traction motor, is connected to a ring gear (output) via additional gearing in a transaxle. Engine torque powers the generator to charge the battery. The generator can also contribute to the necessary wheel (output shaft) torque. The traction motor is used to contribute wheel torque and to recover braking energy to charge the battery if a regenerative braking system is used.

The desirability of combining an ICE with an electric motor is clear. The ICE's fuel consumption and emissions are reduced with no appreciable loss of vehicle performance or range. Nevertheless, there remains a substantial opportunity to develop ways to optimize HEV operation.

One area of development is the way of starting a PHEV or a PSHEV from standstill or almost standstill and accelerating the vehicle up to a low speed. For driveability and transmission durability reasons it is desirable to choose as high start gear (low starting gear ratio) as possible. Clutch wear on the other hand motivates a low startgear so a compromise has to be made. For a hybrid truck that uses an electrical machine for starting the vehicle, clutch wear is not a problem when there is enough energy in the battery and the combustion engine is disengaged and usually also turned off during start. This enables the use of a starting gear that is perhaps 2 to 3 steps higher than a starting gear selected for starting the vehicle with the combustion engine.

The problem is that the input shaft speed of the transmission may not reach idle speed of the combustion engine for long periods when a vehicle makes very many short accelerations up to low peak speeds, for example slow traffic queue driving. This means that the combustion engine is not started in the intended way during driving and the battery containing electric propulsion power can be drained. Eventually the combustion engine has to be started due to low state of charge (SOC) and the charge of the battery can be initiated during vehicle standstill instead of during driving. This behaviour is inefficient. As an example in an empty hybrid electric truck equipped with an Automated Manual Transmission gear 4 can be selected as a starting gear under normal conditions.

One known solution is to permanently lower the starting gear. This will decrease driveability and transmission durability.

A technical problem addressed by the present invention is therefore to provide an improved starting gear selection functionality for hybrid electric vehicles.

It is desirable to find a way to be able to use relatively high starting gears without loosing too much efficiency.

According to a first aspect of the invention a first driving sequence comprising the following steps is registered:
registering a combustion engine being turned off and disengaged from driving wheels of said hybrid electric vehicle;
selecting and engaging a first starting gear ratio and accelerating said hybrid electric vehicle with mainly only an electric motor;—ending said first driving sequence without changing said gear ratio by retarding said hybrid electric vehicle to zero or almost zero speed; And where said method is characterized in that:
upon detection that said first driving sequence has occurred and no gear ratio shift from said starting gear ratio has occurred, altering selection of a starting gear ratio to a starting gear ratio being higher, compared to said first starting gear ratio, for the next vehicle take off of a driving sequence following said first driving sequence.

Said above mentioned embodiment can further comprise that if during said first driving sequence, said combustion engine has been started one or several times then cancelling said altering of starting gear ratio.

According to one embodiment of the invention the following further steps are performed:
registering a first parameter indicating that an electric motor energy source has been drained past a predetermined first energy level limit during said first driving sequence and detecting that said no gear ratio shift from said starting gear ratio has occurred and;—upon indication that said predetermined first energy level limit has been past and said no gear ratio shift from said starting gear ratio has occurred, altering selection of a starting gear ratio to a starting gear ratio being higher, compared to said first starting gear ratio, for the next vehicle take off of a driving sequence following said first driving sequence.

According to another aspect of the invention, there is registered a first driving sequence comprising the following steps:—registering a combustion engine being turned off and disengaged from driving wheels of said hybrid electric vehicle;

selecting and engaging a first starting gear ratio and accelerating said hybrid electric vehicle with mainly only an electric motor;

registering a first parameter indicating that an electric motor energy source has been drained past a predetermined first energy level limit during said first driving sequence and; where said method is characterized in that:—upon detection that said first driving sequence has occurred and indication that said predetermined first energy level limit has been past, altering selection of a starting gear ratio to a starting gear ratio being higher, compared to said first starting gear ratio, for the next vehicle take off of a driving sequence following said first driving sequence.

According to one further embodiment of the invention said starting gear ratio of said driving sequence following said first driving sequence can be increased a certain amount compared to said first starting gear ratio, where a selection of said certain amount is dependent of at least registered vehicle top speed during said first driving sequence.

According to another embodiment of the invention originating from the previous embodiment the following steps are further performed for said selection of said certain amount. Said registered vehicle top speed is analyzed with regard to at least one of the following parameters;—duration of said vehicle top speed, speed difference between said registered vehicle top speed and a vehicle speed, which corresponds to a combustion engine speed above idle speed of said combustion engine,—nearest future topography of a road to be traveled by said vehicle.

According to one embodiment of the invention and originating from the embodiments where there is an electric motor energy source present said first parameter is at least one of:
energy consumption in said electric motor energy source;
energy resources available in said electric motor energy source;
quota between said energy consumption and said available energy resources;
vehicle speed during said first driving sequence.

According to one embodiment of the invention and originating from one of the previous embodiments the following further steps can be performed. If said first driving sequence has been registered and during an after coming driving sequence a vehicle speed is reached which corresponds to a combustion engine speed above idle speed of said combustion engine, then initiating starting of said combustion engine and charging of an electric motor energy source to above a predetermined second energy level limit.

According to a further embodiment of the invention and originating from the embodiments where there is an electric motor energy source present the following step can further be performed. If state of charge of said electric motor energy source is above a predetermined second energy level limit then cancelling said altering of starting gear. This embodiment can further comprise the following steps: if said state of charge of said electric motor energy source is above said predetermined second energy level limit then altering starting gear ratio for the next driving sequence back to a lower starting gear ratio or to a starting gear ratio corresponding to said first starting gear ratio according to said first driving sequence.

According to one embodiment of the invention and originating from one of the previous embodiments the following further steps can be performed. Continuing increasing a selected starting gear ratio a certain amount for coming driving sequences, compared to said first starting gear ratio, for every following new detection of a driving sequence being similar to said first driving sequence and upon detection of at least one of said:

predetermined first energy level limit has been past and;
no gear ratio shift from said starting gear ratio has occurred, until having selected a starting gear ratio where a vehicle speed is reached which corresponds to a combustion engine speed above idle speed of said combustion engine, and initiating starting of said combustion engine and charging of said electric motor energy source to above a predetermined second energy level limit.

BRIEF DESCRIPTION OF THE DRAWING

The present invention will be described in greater detail below with reference to the accompanying drawings which, for the purpose of exemplification, shows further embodiments of the invention and also the technical background, and in which.

DETAILED DESCRIPTION

Figure 1A:
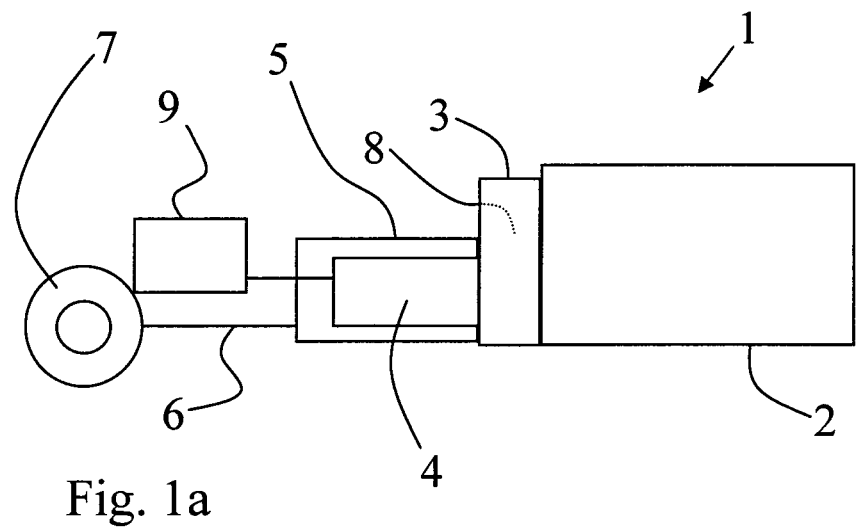
FIGS. 1a and 1b show an example of a PHEV power train which is suitable for the use of the different embodiments of the invention, which will be further explained below.
Figure 1B:
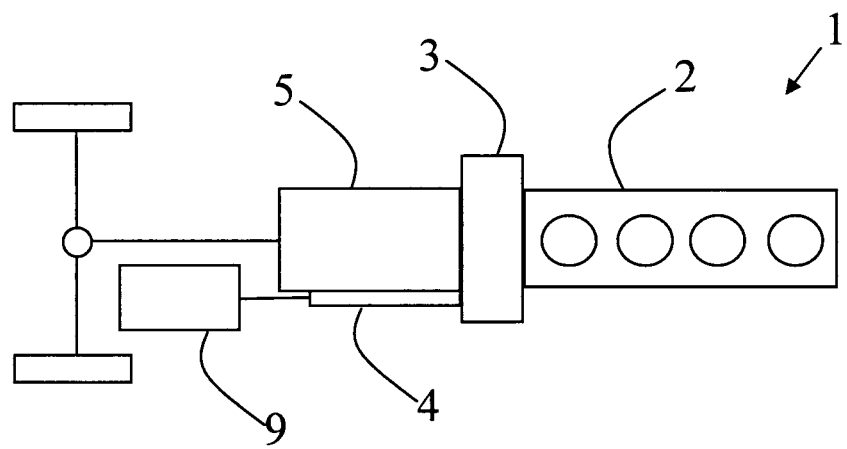

FIGS. 1a and 1b disclose a PHEV power train 1 which comprises a combustion engine 2, an electric motor/generator 3, a control unit 4, a transmission 5, a propeller shaft 6 and drive wheels 7. Arranged mainly coaxially inside of said electric motor/generator 3 is a clutch 8 (not visible in FIGS. 1a or 1b), which is arranged to transmit torque between the engine 2 and the transmission 5 and which can be engaged or disengaged depending of vehicle condition. The clutch and the electric motor/generator can be arranged in a serial manner as well with the electric motor/generator arranged between said clutch and transmission. The transmission can be a step geared AMT with several gear ratios. The hardware configuration as such can be configured according to known art. The control unit is arranged for control of at least said combustion engine, electric motor/generator, AMT and clutch. There can be more than one control units for performing the control of at least said combustion engine, electric motor/generator, AMT and/or clutch. The electric motor/generator can be connected to an electric motor energy source 9, which can for example be a battery or capacitor or other type of energy storing device. The electric motor energy source 9 is arranged to provide the electric motor/generator with driving power. Under right conditions, such as the electric motor/generator being driven by said combustion engine, the electric motor/generator is arranged to charge the electric motor energy source 9 in a known way.

Figure 2:
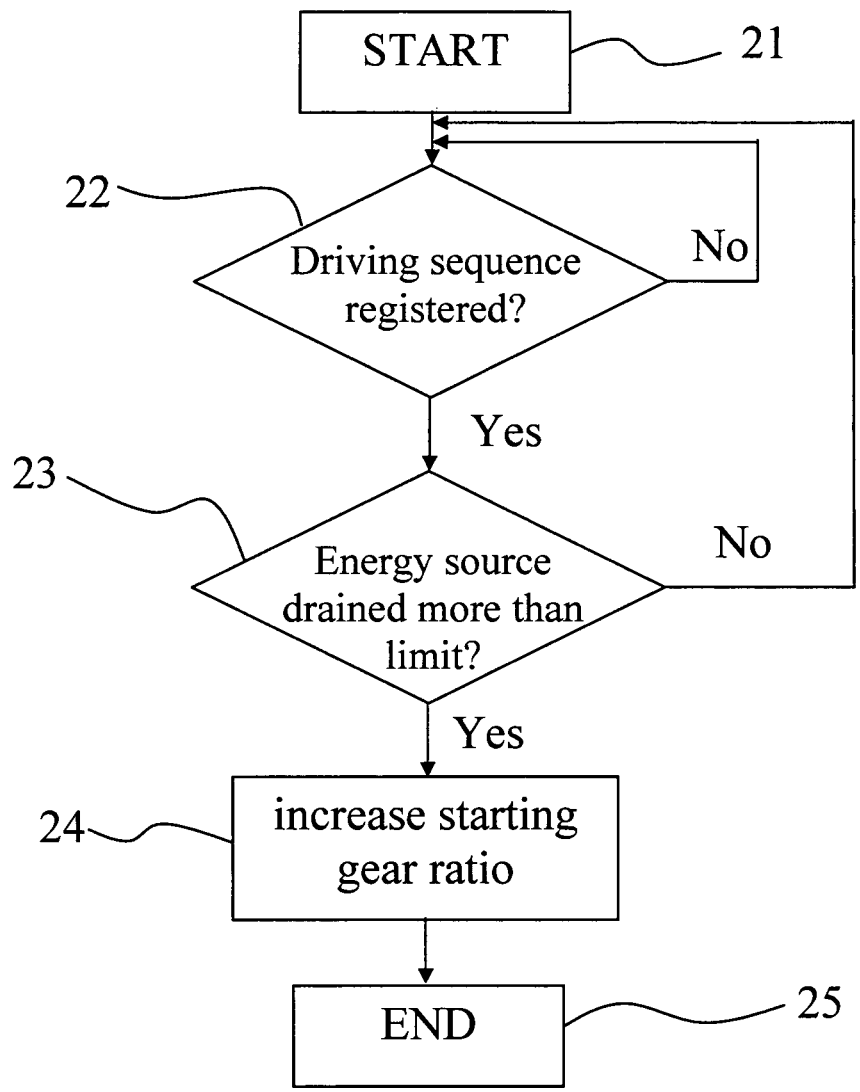
FIG. 2 shows a simplified flow chart of a method according to one embodiment of the invention.

According to one embodiment of the invention the control unit 4 (or units) is programmed to firstly recognize or register a certain type of driving sequence. The inventive control sequence disclosed in FIG. 2 starts at 21. To be registered as a first driving sequence said driving sequence has to comprise the following steps:

registering a combustion engine being turned off and disengaged from driving wheels of said hybrid electric vehicle;

selecting and engaging a first starting gear ratio and accelerating said hybrid electric vehicle with mainly only an electric motor 3.

If detection of such a driving sequence 22 has occurred said control unit is programmed to:

register (step 23) a first parameter indicating that an electric motor energy source 9 has been drained past a predetermined first energy level limit during said first driving sequence.

If said driving sequence has been registered (step 22) and said first parameter has been affected past said predetermined first energy level limit (step 23) said control unit is programmed to alter selection of a starting gear ratio in step 24 to a starting gear ratio being higher, compared to said first starting gear, for the next vehicle take off of a driving sequence following said registered first driving sequence. If the outcome in one of steps 23 or 24 is NO then the sequence starts all over again. A higher starting gear ration means a lower gear step in a AMT such as the one disclosed in FIG. 1. Said inventive sequence ends at step 25. The advantage is that the possibility that the vehicle during the engagement and driving with said altered starting gear ratio will reach a vehicle speed that corresponds to a combustion engine speed above idle speed of said combustion engine increases, due to the higher starting gear ratio. Thus, the possibility to reach a condition where initiation of starting of said combustion engine can occur, which makes charging of an electric motor energy source during driving possible, is increased.

Figure 3:
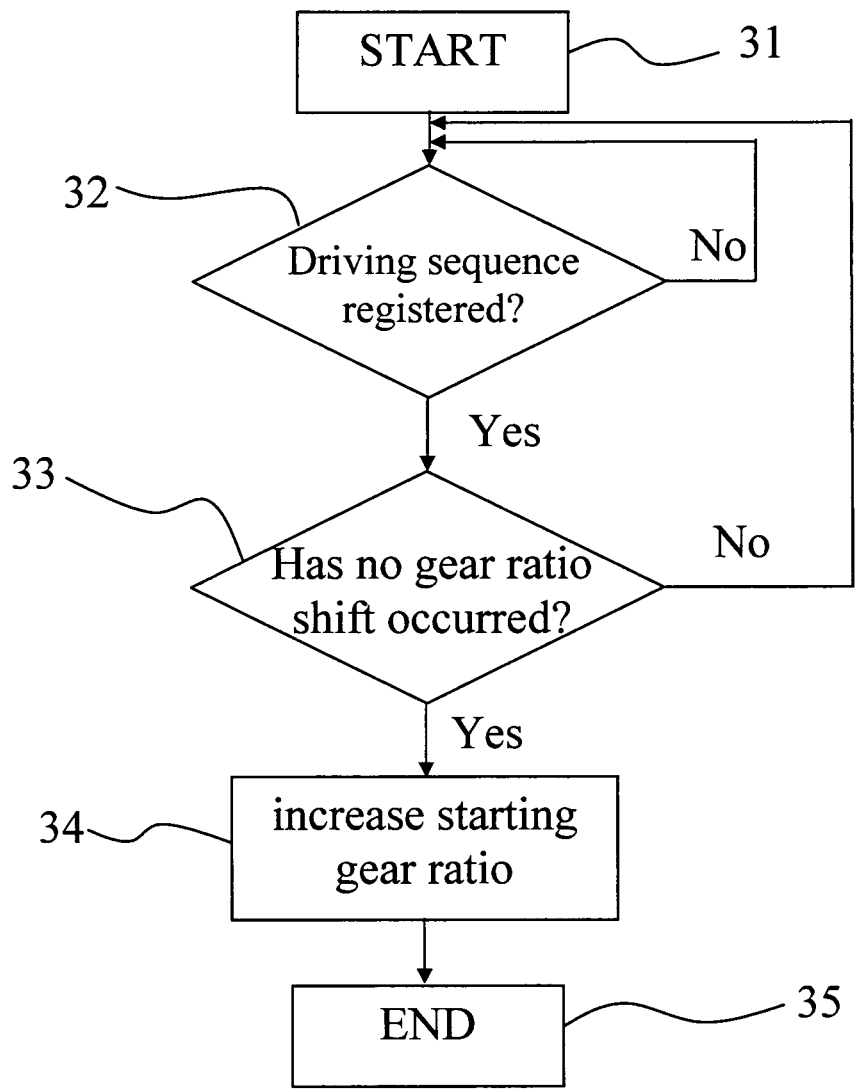
FIG. 3 shows also a simplified flow chart of a method according to another embodiment of the invention.

According to a further embodiment of the invention presented through FIG. 3 said starting gear ration can be increased without registering said first parameter indicating that an electric motor energy source has been drained. Also in this embodiment said control unit can be programmed to register a first driving sequence (step 32) comprising the following steps:

registering a combustion engine being turned off and disengaged from driving wheels of said hybrid electric vehicle;

selecting and engaging a first starting gear ratio and accelerating said hybrid electric vehicle with mainly only an electric motor;—ending said first driving sequence without changing said gear ratio by retarding said hybrid electric vehicle to zero or almost zero speed;

Said control unit is further programmed to:

upon detection that said first driving sequence has occurred and no gear ratio shift from said starting gear ratio has occurred (step 33), altering selection of a starting (step 34) gear ratio 24 to a starting gear ratio being higher, compared to said first starting gear ratio, for the next vehicle take off of a driving sequence following said first driving sequence.

Thus, said "no gear shift" is used as an indication of that said electric motor energy source is or is on its way to be drained.

In an alternative embodiment said registering that a first parameter indicating;

that according to step 23 an electric motor energy source has been drained past a predetermined first energy level limit during said first driving sequence and, according to step 33 detecting that said no gear ratio shift from said starting gear ratio has occurred, can be combined in a single embodiment. Said control unit can then be programmed to upon indication that said predetermined first energy level limit has been past and that said no gear ratio shift from said starting gear ratio has occurred, alter selection of a starting gear ratio to a starting gear ratio being higher, compared to said first starting gear ratio, for the next vehicle take off of a driving sequence following said first driving sequence.

The following embodiments can be used together with each one of the embodiments presented above, with exception of embodiments mentioned below that includes a first parameter indicating that an electric motor energy source 9 has been drained past a predetermined first energy level limit during said first driving sequence. As naturally understandable these embodiments cannot be used together with the embodiment described above comprising the feature that no gear ratio shift from said starting gear ratio has occurred and without the registration of a first parameter indicating that an electric motor energy source 9 has been drained past a predetermined first energy level limit According to an alternative embodiment of the invention the control unit 4 can further be programmed to increase said starting gear ratio (for example one gear step lower in said AMT) of a driving sequence following said first driving sequence a certain amount compared to said first starting gear ratio. Said selection of said certain amount can be dependent of at least registered vehicle top speed during said first driving sequence. For example, if a top speed is reached which corresponds to a combustion engine speed just a little above idle speed of said combustion engine (for example 50 rpm over) and independent of if said top speed lasts for long or a short time, the control unit can be programmed to increase said starting gear ratio even further (for example at least two gear steps lower in said AMT) compared to said first starting gear ratio.

On the other hand if a top speed is reached which corresponds to a combustion engine speed quite a lot above idle speed of said combustion engine (for example more than 500 rpm over) and the vehicle speed, including said top speed, is maintained over the vehicle speed that corresponds to the combustion engine idle speed during a relatively short time, the control unit can still be programmed to increase said starting gear ratio even further (for example at least two gear steps in said AMT) compared to said first starting gear ratio.

If a top speed is reached which corresponds to a combustion engine speed just a little above idle speed of said combustion engine but the vehicle speed, including said top speed, is maintained during a relatively short time, the control unit can be programmed to increase said starting gear ratio so it corresponds to at least three (if available) gear steps lower compared to said first starting gear ratio (or gear).

Said control unit can according to the invention further be programmed to select a certain amount of an increased gear ratio (i.e. corresponding to a certain number of gear steps lower) compared to said first starting gear ratio. The selection of said certain amount can be based on the outcome of an analysis of said registered top speed with regard to at least one of or several of the following parameters;

duration of said top speed during said registered first driving sequence;—speed difference between said registered top speed and a vehicle speed, which corresponds to a combustion engine speed above idle speed of said combustion engine, during said registered first driving sequence;

nearest future topography of a road to be traveled by said vehicle, where information about said nearest future topography is completed with information about current vehicle condition.

The advantage is that a better decision can be taken by the control unit 4. The transmission will adapt faster. The efficiency of the power train can be further increased.

Information about the nearest future topography of a road to be traveled by said vehicle can be provided in a known way, for example by a Global Positioning System (GPS) in combination with an electronic map or a transmitter system along the road to be traveled which can send information about the road and/or traffic for the coming road to said control unit 4.

According to a further embodiment of the invention said first parameter can be at least one of or several of:
- energy consumption in said electric motor energy source 9;
- energy resources available in said electric motor energy source 9;—quota between said energy consumption and said energy resources;
- vehicle speed during said first driving sequence.

Said first parameters can be measured and registered in a known way. When using the vehicle speed as said first parameter, said vehicle speed is an indirect measure of how much the electric motor energy source 9 is drained. For example if the vehicle is accelerated up to a vehicle speed that corresponds to a vehicle speed just below said combustion engine idle speed, and considering the energy storage capacity of said electric motor energy source 9 it can be assumed that such an acceleration to said vehicle speed can cause a substantial drainage of said electric motor energy source 9. In a further additional embodiment of the invention said control unit can be programmed to consider the acceleration as such and/or road and vehicle condition (for example road inclination, vehicle mass, road surface) and/or duration of said driving sequence in order to better indicate the size of drainage of the electric motor energy source 9.

Said control unit 4 can be arranged to continuously receive information about one or several of said mentioned measured first parameters. Said control unit can be programmed to compare each of said measured first parameter with a limit value predetermined for each of said first parameters. Said predetermined limit values are respectively determined with regard to the performance values of said electric motor energy source 9, but also with regard to the charging/discharging performance of said electric motor/generator. Said control unit can in an alternative embodiment be programmed to charge said electric motor energy source to above a predetermined second energy level limit, which can differ from said first energy level limit, before altering the starting gear ratio back to a lower starting gear ratio for the next driving sequence or to a starting gear ratio corresponding to said first starting gear ratio according to said first driving sequence. Said second energy level limit indicates a higher energy content in said electric motor energy source compared to said first energy level limit.

In a further embodiment of the invention said control unit is programmed to continue the increase of a selected starting gear ratio a certain amount for coming driving sequences, compared to said first starting gear ratio, for every following new detection of a driving sequence being similar to said first driving sequence and upon detection of at least one of said:
- predetermined first energy level limit has been past and;
- no gear ratio shift from said starting gear ratio has occurred, until having selected a starting gear ratio where a vehicle speed is reached which corresponds to a combustion engine speed above idle speed of said combustion engine, and initiating starting of said combustion engine and charging of said electric motor energy source 9 to above said predetermined second energy level limit.

Thus, in this embodiment an increase of the starting gear ratio (corresponding to one gear step) for each new registered driving sequence being similar to said first driving sequence is continued until charging of said electric motor energy source can be initiated.

The according to the above described inventive embodiments increased starting gear ratio selection can be cancelled when the vehicle has accelerated and the transmission has upshifted, for example, 2 or 3 gear steps above the normally selected starting gear (above said first starting gear). In another embodiment said control unit can be programmed to register that said state of charge of said electric motor energy source 9 has reached above said predetermined second energy level limit and then alter starting gear ratio for the next driving sequence back to a lower starting gear ratio or to a starting gear ratio corresponding to said first starting gear ratio according to said first driving sequence.

According to one embodiment said control unit can be programmed to during a first driving sequence perform the following steps:
- registering that the combustion engine has been turned off and disengaged from driving wheels of said hybrid electric vehicle;—selecting and engaging a first starting gear ratio and accelerating said hybrid electric vehicle with the electric motor, meaning that vehicle propulsion is electric;
- during said first driving sequence registering a first parameter indicating that an electric motor energy source 9 has been drained past a predetermined first energy level limit during said first driving sequence and;
- upon detection that said electric motor energy source has been drained starting said combustion engine with said electric motor during said first driving sequence in order to charge said electric motor energy source.

The above mentioned embodiments of the invention can also be applied to a PSHEV (power split), comprising a CVT.

Figure 4:
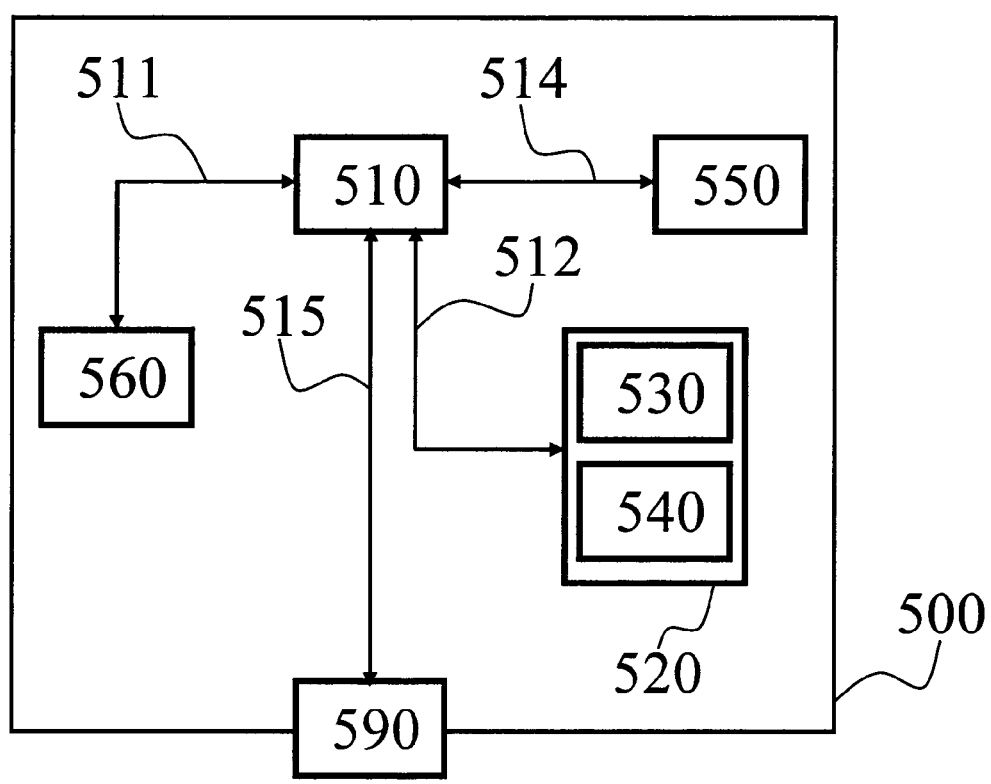
FIG. 4 shows the invention applied on a computer arrangement.

FIG. 4 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the control unit 4. The data-processing unit 510 can comprise, for example, a microcomputer.

The memory 520 also has a second memory part 540, in which a program for selecting a starting gear in a hybrid electric vehicle according to the invention is stored. In an alternative embodiment, the program for selecting a starting gear in a hybrid electric vehicle is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. Method for selecting a starting gear in a hybrid electric vehicle, where a first driving sequence comprising the following steps is registered, comprising:
    registering a combustion engine being turned off and disengaged from driving wheels of the hybrid electric vehicle;
    selecting and engaging a first starting gear ratio and accelerating the hybrid electric vehicle with mainly only an electric motor;
    ending the first driving sequence without changing the gear ratio by retarding the hybrid electric vehicle to zero or almost zero speed; and
    upon detection that the first driving sequence has occurred and no gear ratio shift from the starting gear ratio has occurred, altering selection of a starting gear ratio to a starting gear ratio being higher, compared to the first starting gear ratio, for the next vehicle take off of a driving sequence following the first driving sequence.

2. Method as in claim 1, comprising:
    registering a first parameter indicating that an electric motor energy source has been drained past a predetermined first energy level limit during the first driving sequence and detecting that the no gear ratio shift from the starting gear ratio has occurred; and
    upon indication that the predetermined first energy level limit has been past and the no gear ratio shift from the starting gear ratio has occurred, altering selection of a starting gear ratio to a starting gear ratio being higher, compared to the first starting gear ratio, for the next vehicle take off of a driving sequence following the first driving sequence.

3. Method for selecting a starting gear in a hybrid electric vehicle, where a first driving sequence comprising the following steps is registered, comprising:
    registering a combustion engine being turned off and disengaged from driving wheels of the hybrid electric vehicle;
    selecting and engaging a first starting gear ratio and accelerating the hybrid electric vehicle with mainly only an electric motor;
    registering a first parameter indicating that an electric motor energy source has been drained past a predetermined first energy level limit during the first driving sequence and;
    upon detection that the first driving sequence has occurred and indication that the predetermined first energy level limit has been past, altering selection of a starting gear ratio to a starting gear ratio being higher, compared to the first starting gear ratio, for the next vehicle take off of a driving sequence following the first driving sequence.

4. Method as in claim 1, comprising increasing the starting gear ratio of the driving sequence following the first driving sequence a certain amount compared to the first starting gear ratio, where a selection of the certain amount is dependent on at least registered vehicle top speed during the first driving sequence.

5. Method as in the-preceding claim 1, comprising, for the selection of the certain amount of increase of the gear ratio, analyzing the registered vehicle top speed with regard to at least one of the following parameters;
    duration of the vehicle top speed,
    speed difference between the registered vehicle top speed and a vehicle speed, which corresponds to a combustion engine speed above idle speed of the combustion engine,
    nearest future topography of a road to be traveled by the vehicle.

6. Method as in claim 2, comprising the first parameter is at least one of:
    energy consumption in the electric motor energy source;
    energy resources available in the electric motor energy source;
    quota between the energy consumption and the available energy resources;
    vehicle speed during the first driving sequence.

7. Method as in claim 1, comprising if the first driving sequence has been registered and during subsequent driving sequence a vehicle speed is reached which corresponds to a combustion engine speed above idle speed of the combustion engine, then initiating starting of the combustion engine and charging of an electric motor energy source to above a predetermined second energy level limit.

8. Method as in claim 2, comprising, if a state of charge of the electric motor energy source is above a predetermined second energy level limit, cancelling the altering of starting gear.

9. Method as in claim 8, comprising if the state of charge of the electric motor energy source is above the predetermined second energy level limit then altering starting gear ratio for the next driving sequence back to a lower starting gear ratio or to a starting gear ratio corresponding to the first starting gear ratio according to the first driving sequence.

10. Method as in claim 2, comprising continuing increasing a selected starting gear ratio a certain amount for subsequent driving sequences, compared to the first starting gear ratio, for every following new detection of a driving sequence being similar to the first driving sequence and upon detection of at least one of the:
    predetermined first energy level limit has been past and;
    no gear ratio shift from the starting gear ratio has occurred, until having selected a starting gear ratio where a vehicle speed is reached which corresponds to a combustion engine speed above idle speed of the combustion engine, and initiating starting of the combustion engine and charging of the electric motor energy source to above a predetermined second energy level limit.

11. Method as in claim 1, comprising if, during the first driving sequence, the combustion engine has been started one or several times then cancelling the altering of starting gear ratio.

12. A hybrid electric vehicle comprising a combustion engine and an electric motor/generator both drivingly connected to driven wheels of the vehicle via an automated manual transmission, where a clutch is arranged for engagement/disengagement of the combustion engine from the driven wheels, at least one control unit is arranged for control of at least the combustion engine, electric motor/generator, automated manual transmission and clutch, wherein the control unit is configured to select a starting gear in the hybrid electric vehicle by:
    registering a combustion engine being turned off and disengaged from driving wheels of the hybrid electric vehicle;
    selecting and engaging a first starting gear ratio and accelerating the hybrid electric vehicle with mainly only an electric motor;
    ending the first driving sequence without changing the gear ratio by retarding the hybrid electric vehicle to zero or almost zero speed; and upon detection that the first driving sequence has occurred and no gear ratio shift from the staring gear ratio has occurred altering selection of a starting gear ratio to a starting gear ratio being higher, compared to the first starting gear ratio, for the next vehicle take off of a driving sequence following the first driving sequence.

13. A hybrid electric vehicle comprising a combustion engine and an electric motor and generator both drivingly connected to driven wheels of the vehicle, a continuously variable transmission arranged for engagement/disengagement of the combustion engine from the driven wheels, at least one control unit is arranged for control of at least the combustion engine, electric motor/generator and the continuously variable transmission, wherein the control unit is configured to select a starting gear in the hybrid electric vehicle by:
- registering a combustion engine being turned off and disengaged from driving wheels of the hybrid electric vehicle;
- selecting and engaging a first starting gear ratio and accelerating the hybrid electric vehicle with mainly only an electric motor;
- ending the first driving sequence without changing the gear ratio by retarding the hybrid electric vehicle to zero or almost zero speed; and
- upon detection that the first driving sequence has occurred and no gear ratio shift from the starting gear ratio has occurred altering selection of a starting gear ratio to a starting gear ratio being higher, compared to the first starting gear ratio, for the next vehicle take off of a driving sequence following the first driving sequence.

14. A computer comprising program code means for performing when executed by a processor, a method for selecting a starting gear in a hybrid electric vehicle, the method comprising:
- registering a combustion engine being turned off and disengaged from driving wheels of the hybrid electric vehicle;
- selecting and engaging a first starting gear ratio and accelerating the hybrid electric vehicle with mainly only an electric motor;
- ending the first driving sequence without changing the gear ratio by retarding the hybrid electric vehicle to zero or almost zero speed; and
- upon detection that the first driving sequence has occurred and no gear ratio shift from the starting gear ratio has occurred, altering selection of a starting gear ratio to a starting gear ratio being higher, compared to the first starting gear ratio, for the next vehicle take off of a driving sequence following the first driving sequence.

15. A computer program product on a non-transitory medium comprising program code for performing when executed by a processor, a method for selecting a starting gear in a hybrid electric vehicle, the method comprising:
- registering a combustion engine being turned off and disengaged from driving wheels of the hybrid electric vehicle;
- selecting and engaging a first starting gear ratio and accelerating the hybrid electric vehicle with mainly an electric vehicle;
- ending the first driving sequence without changing the gear ratio by retarding the hybrid electric vehicle to zero or almost zero speed; and
- upon detection that the first driving sequence has occurred and no gear ratio shift from the starting near ratio has occurred altering selection of a starting gear ratio to a starting gear ratio being higher, compared to the first starting gear ratio, for the next vehicle take off of a driving sequence following the first driving sequence.

16. A non-transitory storage medium comprising a computer readable program code to perform when executed by a processor, a method for selecting a starting gear in a hybrid electric vehicle, the method comprising:
- registering a combustion engine being turned off and disengaged from driving wheels of the hybrid electric vehicle;
- selecting and engaging a first starting gear ratio and accelerating the hybrid electric vehicle with mainly only an electric motor;
- ending the first driving sequence without changing the gear ratio by retarding the hybrid electric vehicle to zero or almost zero speed; and
- upon detection that the first driving sequence has occurred and no gear ratio shift from the starting gear ratio has occurred, altering select on of a starting gear ratio to a starting gear ratio being higher, compared to the first starting gear ratio, for the next vehicle take off of a driving sequence following the first driving sequence.

* * * * *